E. H. JONES.
METHOD OF MANUFACTURING WHEELS OR PULLEYS.
APPLICATION FILED SEPT. 30, 1907.
987,141.
Patented Mar. 21, 1911.
2 SHEETS—SHEET 1.
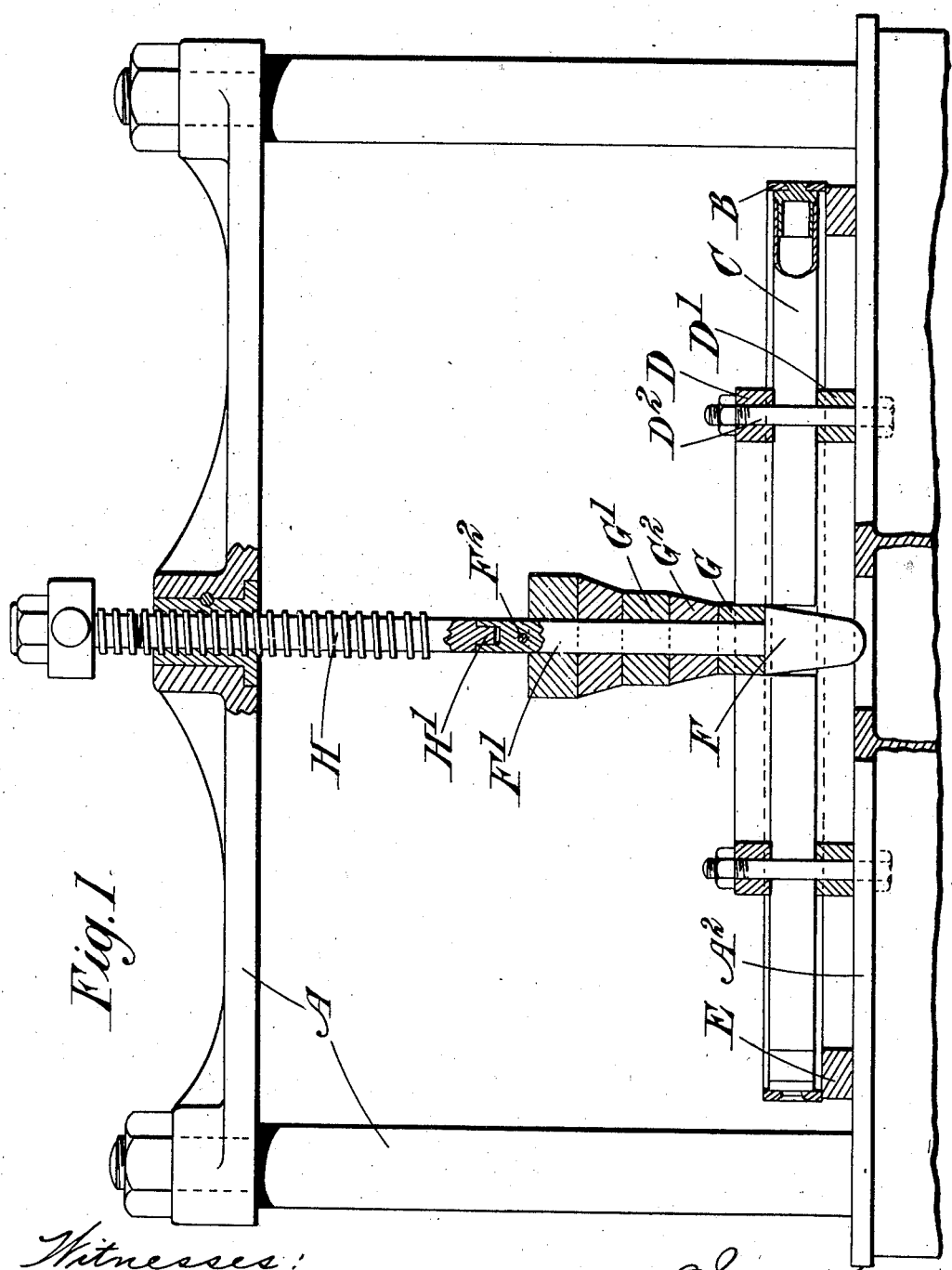

E. H. JONES.
METHOD OF MANUFACTURING WHEELS OR PULLEYS.
APPLICATION FILED SEPT. 30, 1907.
987,141.
Patented Mar. 21, 1911.
2 SHEETS—SHEET 2.
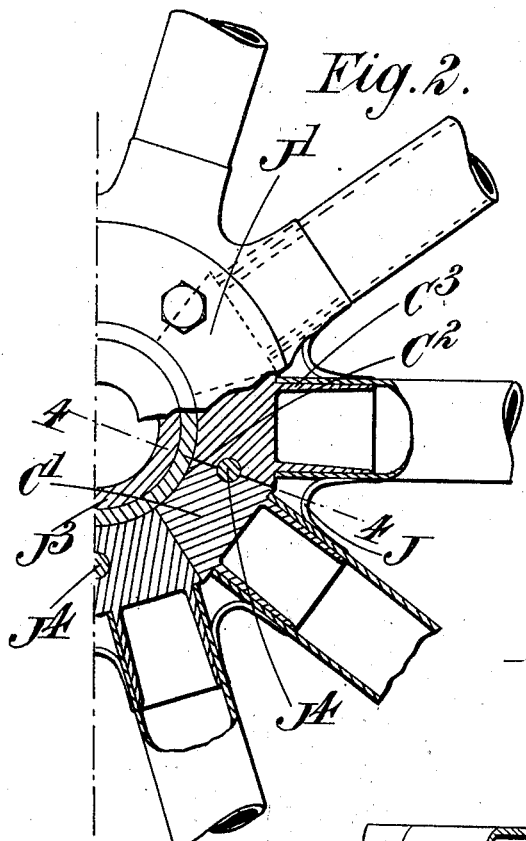
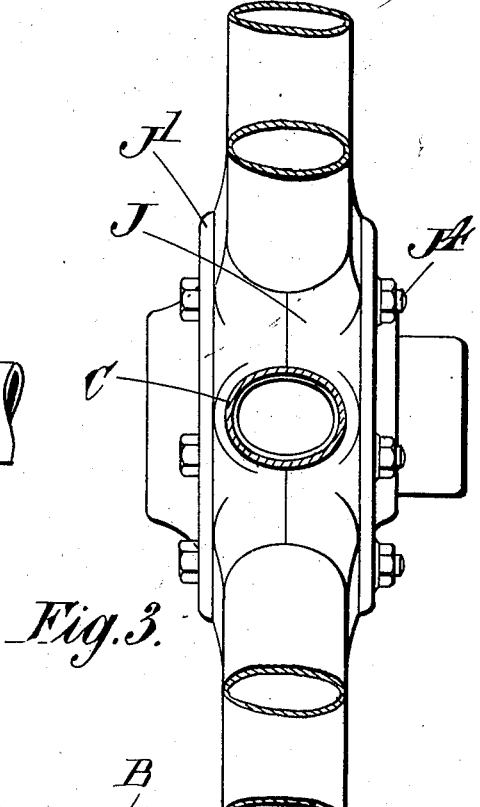
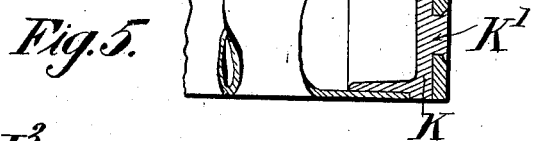
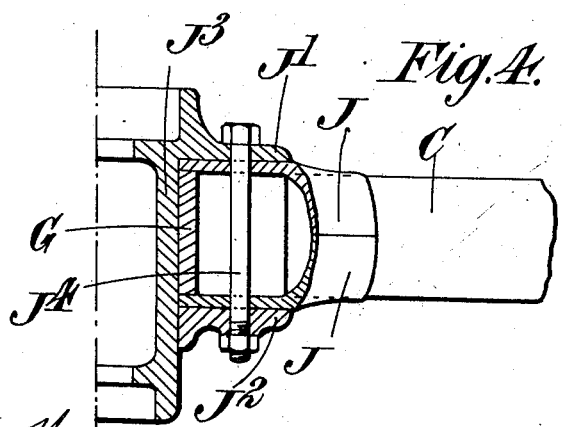
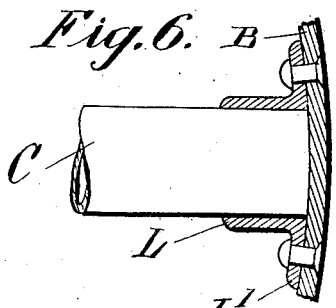

UNITED STATES PATENT OFFICE.

ERNEST HENRY JONES, OF ISLINGTON, LONDON, ENGLAND.

METHOD OF MANUFACTURING WHEELS OR PULLEYS.

987,141.   Specification of Letters Patent.   Patented Mar. 21, 1911.

Application filed September 30, 1907. Serial No. 395,277.

*To all whom it may concern:*

Be it known that I, ERNEST HENRY JONES, a subject of the King of Great Britain, residing at Islington, London, England, have invented certain new and useful Methods of Manufacturing Wheels or Pulleys, of which the following is a specification.

This invention relates to the manufacture of wheels or pulleys wherein the spokes are forced into position in an encircling rim by radial thrust.

An important feature of the present invention is a method of manufacture of such wheels characterized by (a) the assembly of the spokes loosely within the rim, each in the particular plane transverse to the wheel axis that it is to occupy in the finished wheel and (b) the application, subsequently, and in order to provide for the insertion of a central boss, of a compressive end thrust (by means for instance of a taper mandrel) at the inner ends of the spokes while each is maintained in the plane aforesaid.

Other features of this invention will be evident from the following description taken in conjunction with the accompanying drawings, in which:—

Figure 1 is an elevation, partly in section, of apparatus for assembling vehicle wheels or the like according to one embodiment of this invention; Fig. 2 is a half view in plan partly in section of a portion of a wheel assembled in the manner shown in Fig. 1; Fig. 3 is an elevation at right angles to Fig. 2. Fig. 4 is a section on the line 4—4 of Fig. 2; Fig. 5 shows one method of fastening the spokes to the rim of the wheel; Fig. 6 shows another method.

Like letters indicate like parts throughout the drawings.

Referring to the drawings, a strong frame A is provided over a table $A^1$ which is preferably in the form of a gird. A metal rim B is placed on this table, the spokes C in the form of metal tubes being placed in the positions which they are to finally occupy in the finished wheel. To firmly clamp the spokes and rim, rings D $D^1$ may be arranged on the two sides of the spokes respectively and bolted together by bolts $D^2$ passing between the spokes, the rim resting on a ring E. A coned mandrel F is provided with a spindle $F^1$ on to which can be threaded a number of different sized rings or bosses such as G $G^1$ these being separated by coned mandrels such as $G^2$. A pin $F^2$ passing through the spindle $F^1$ prevents the rings G $G^1$ and mandrels $G^2$ from moving upward on the spindle $F^1$.

The mandrel is forced downward by means of a screw H working in the framework A, the end of the screw being provided with a reduced portion $H^1$ which fits into a corresponding recess in the spindle $F^1$. By providing such a connection between the screw H and spindle $F^1$, the screw is able to rotate without necessarily rotating the mandrel.

In assembling a wheel, after the spokes and rim have been fixed in position, the mandrel F is forced downward, thereby forcing the spokes radially outward, and by continuing to screw the spindle $F^1$ downward a ring or boss such as G of suitable size is fixed in position. The hub is afterward fixed within the ring G.

In practice the hubs and spokes are generally of a standard or fixed size, but the rims vary to a certain extent for wheels of the same nominal size. By arranging the spindle $F^1$ to take a number of rings and mandrels as described above, it is evident that a ring of suitable size to compensate for the variation in the diameters of the rims may be conveniently and quickly fixed in position.

To keep the spokes in position on the ring, pieces such as $C^1$ (Fig. 2) are provided, these pieces having cylindrical surfaces $C^2$ adapted to fit against the ring. The spoke C fits over the reduced portion $C^3$ of the piece $C^1$. The pieces are put in due relation to the spokes before the compression is applied. To prevent the spokes being knocked out of place and also as a protection against dirt and damp, plates J (Figs. 2, 3 and 4) may be fixed on each end of the ring. As shown in the figures referred to, the plates J are fixed or held in position between the ring G and flanges $J^1$ and $J^2$ respectively on the hub $J^3$. Suitable holes are provided in the plates J through which the bolts $J^4$ can pass. The plates J may conveniently be stampings of metal of a form such as shown, the two parts being adapted to form close contact with each other and with the spokes, thereby protecting the spokes and hub-ring against dirt and damp.

One convenient method of fixing the end of the spoke to the rim B of the wheel is shown in Fig. 5. A metal piece K is provided having a reduced portion K¹ which is adapted to pass through a hole in the rim B and act as a rivet. The spoke C fits over the metal piece K, as shown in the drawings. Another method of fixing the spokes to the rim is shown in Fig. 6. According to this method a cup-shaped metal piece L is provided with a flange L¹ which is riveted to the rim B. The spoke C fits into the cup L, as shown. The pieces K and L are assembled on the spokes before the latter are compressed endwise.

It is obvious that various modifications may be made in the methods of carrying this invention into effect, for example, the spokes and rim might be held in their correct positions in a jig or similar apparatus and then forced over a mandrel fixed in position. Furthermore, in the description given above, the spokes have been described as consisting of metal tubes, but it is obvious that the same method could be employed in fixing spokes of other form and other material.

It is obvious that the method of assembling according to this invention may be employed with structures other than vehicle wheels, such for example, as pulleys.

What I claim as my invention and desire to secure by Letters Patent is:—

1. The herein described method of manufacturing wheels or pulleys which consists in assembling the parts—the spokes, the rim, segments at the central ends of the spokes and operatively connected with said spokes, in the same relative positions which they are to occupy in the finished wheel, applying end-pressure to the segments and through them to the spokes whereby to cause the spokes to firmly engage the rim and segments, then inserting a maintaining ring to maintain the parts in position, and finally arranging a hub within said ring.

2. The herein described method of manufacturing wheels or pulleys, which consists in assembling the parts—the spokes, hub-segments and rim, in the same relative positions which they are to occupy in the finished wheel, inserting a tapered mandrel at the center of the wheel forcing the mandrel endwise thereby applying end-pressure to the segments and through them to the spokes whereby to cause the spokes to firmly engage the rim and segments, then inserting a maintaining ring to maintain the parts in position, then removing the mandrel, and then inserting a hub within the ring.

3. The herein described method of manufacturing wheels or pulleys which consists in assembling the parts—the spokes, and rim, in the same relative positions which they are to occupy in the finished wheel, inserting a tapered mandrel at the center of the wheel, and subsequently rings and mandrels of increasing diameter, forcing the mandrel endwise thereby applying end-pressure to the inner ends of the spokes whereby to cause the spokes to firmly engage the rim and segments, forcing the mandrels endwise in succession, fitting a maintaining ring of requisite diameter in position, and then removing the mandrels leaving only the ring which fits in place.

In testimony whereof I have signed my name to this specification in the presence of two subscribing witnesses.

ERNEST HENRY JONES.

Witnesses:
  ETHEL MANWARING.
  W. J. WHITTEM.